United States Patent
Sridharan et al.

(10) Patent No.: US 10,684,902 B2
(45) Date of Patent: Jun. 16, 2020

(54) METHOD AND APPARATUS FOR MEMORY VULNERABILITY PREDICTION

(71) Applicant: Advanced Micro Devices, Inc., Sunnyvale, CA (US)

(72) Inventors: Vilas Sridharan, Boxborough, MA (US); David A. Roberts, Boxborough, MA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 70 days.

(21) Appl. No.: 15/662,524

(22) Filed: Jul. 28, 2017

(65) Prior Publication Data

US 2019/0034251 A1    Jan. 31, 2019

(51) Int. Cl.
*G06F 11/00* (2006.01)
*G06F 11/30* (2006.01)
*G06F 11/34* (2006.01)

(52) U.S. Cl.
CPC ........ *G06F 11/008* (2013.01); *G06F 11/3034* (2013.01); *G06F 11/3037* (2013.01); *G06F 11/3447* (2013.01); *G06F 2201/81* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,778,436 A * | 7/1998 | Kedem | ............... | G06F 12/0862 711/122 |
| 6,993,638 B2 * | 1/2006 | Ukai | ................. | G06F 9/355 711/204 |
| 7,930,485 B2 * | 4/2011 | Fertig | .................. | G06F 9/383 711/137 |
| 2011/0107053 A1 * | 5/2011 | Beckmann | ............ | G06F 3/0608 711/171 |
| 2015/0347029 A1 * | 12/2015 | Kotte | .................... | G06F 3/0611 711/103 |

OTHER PUBLICATIONS

Biswas, A. et al., "Computing Architectural Vulnerability Factors for Address-Based Structures", Proceedings of the 32nd Annual International Symposium on Computer Architecture, Jun. 4-8, 2005, pp. 532-543, IEEE Computer Society, Madison, WI, USA.

Mukherjee, S. et al., "A Systematic Methodology to Compute the Architectural Vulnerability Factors for a High-Performance Microprocessor", Proceedings of the 36th Annual International Symposium on Microarchitecture, Dec. 3-5 2003, 12 pgs., IEEE Computer Society, San Diego, CA, USA.

(Continued)

*Primary Examiner* — Amine Riad
(74) *Attorney, Agent, or Firm* — Volpe and Koenig, P.C.

(57) ABSTRACT

Described herein are a method and apparatus for memory vulnerability prediction. A memory vulnerability predictor predicts the reliability of a memory region when it is first accessed, based on past program history. The memory vulnerability predictor uses a table to store reliability predictions and predicts reliability needs of a new memory region. A memory management module uses the reliability information to make decisions, (such as to guide memory placement policies in a heterogeneous memory system).

20 Claims, 3 Drawing Sheets

(56) References Cited

OTHER PUBLICATIONS

Walcott, K. et al., "Dynamic Prediction of Architectural Vulnerability from Microarchitectural State", Proceedings of the 34th Annual International Symposium on Computer Architecture, Jun. 9-13, 2007, pp. 516-527, ACM, San Diego, CA, USA.

Meswani, M. et al., "Heterogeneous Memory Architectures: A HW/SW Approach for Mixing Die-stacked and Off-package Memories", Proceedings of the 21st International Symposium on High Performance Computer Architecture, Feb. 7-11, 2015, pp. 1-11, IEEE, San Francisco, CA, USA.

Sridharan, V. et al., "A Study of DRAM Failures in the Field", Proceedings of the International Conference on High Performance Computing, Networking, Storage and Analysis, Nov. 10-16, 2012, pp. 1-11, IEEE, Salt Lake City, UT, USA.

Nair, P. et al., "FaultSim: A Fast, Configurable Memory Reliability Simulator for Conventional and 3D-Stacked Systems", ACM Transactions on Architecture and Code Optimization, Jan. 2016, pp. 44-1 to 44-24, vol. 12, Issue 4, Article No. 44, ACM, New York, NY, USA.

Sim, J. et al., "Transparent Hardware Management of Stacked DRAM as Part of Memory", Proceedings of the 47th Annual International Symposium on Microarchitecture, Dec. 13-17, 2014, pp. 13-24, IEEE, Cambridge, UK.

Li, X. et al., "Online Estimation of Architectural Vulnerability Factor for Soft Errors", Proceedings of the International Symposium on Computer Architecture, Jun. 21-25, 2008, pp. 341-352, ACM, Beijing, CN.

\* cited by examiner

METHOD AND APPARATUS FOR MEMORY VULNERABILITY PREDICTION

BACKGROUND

Computer devices include processing units that store and retrieve data in memory. Computing devices may incorporate multiple memory units with different performance characteristics (e.g., latency and/or bandwidth). Memory placement policies have a large impact on the performance, power, and reliability of the computer devices and memory. These memory placement policies however rely on measuring the reliability of a page, for example, after the page is accessed or to be known and provided by a programmer to guide page placement.

BRIEF DESCRIPTION OF THE DRAWINGS

A more detailed understanding may be had from the following description, given by way of example in conjunction with the accompanying drawings wherein.

DETAILED DESCRIPTION

Described herein are a method and apparatus for memory vulnerability prediction. Predicting the reliability of memory regions or locations (collectively "memory regions") as a program first accesses a memory region can allow a system to better optimize for resilience as well as power and performance. For instance, the system can place memory regions predicted to be or known to be highly-vulnerable in more reliable memory with stronger error correcting codes before a page is first accessed. In general, a memory vulnerability predictor predicts the reliability of a memory region when it is first accessed, based on past program history. The memory vulnerability predictor uses a table to store reliability predictions and predicts reliability needs of a new memory region. A memory management module uses this information to make intelligent decisions (e.g., to guide memory placement policies in a heterogeneous memory system). This is useful, for instance, in code with loops that iterate over a large array or matrix in memory.

Figure 1:
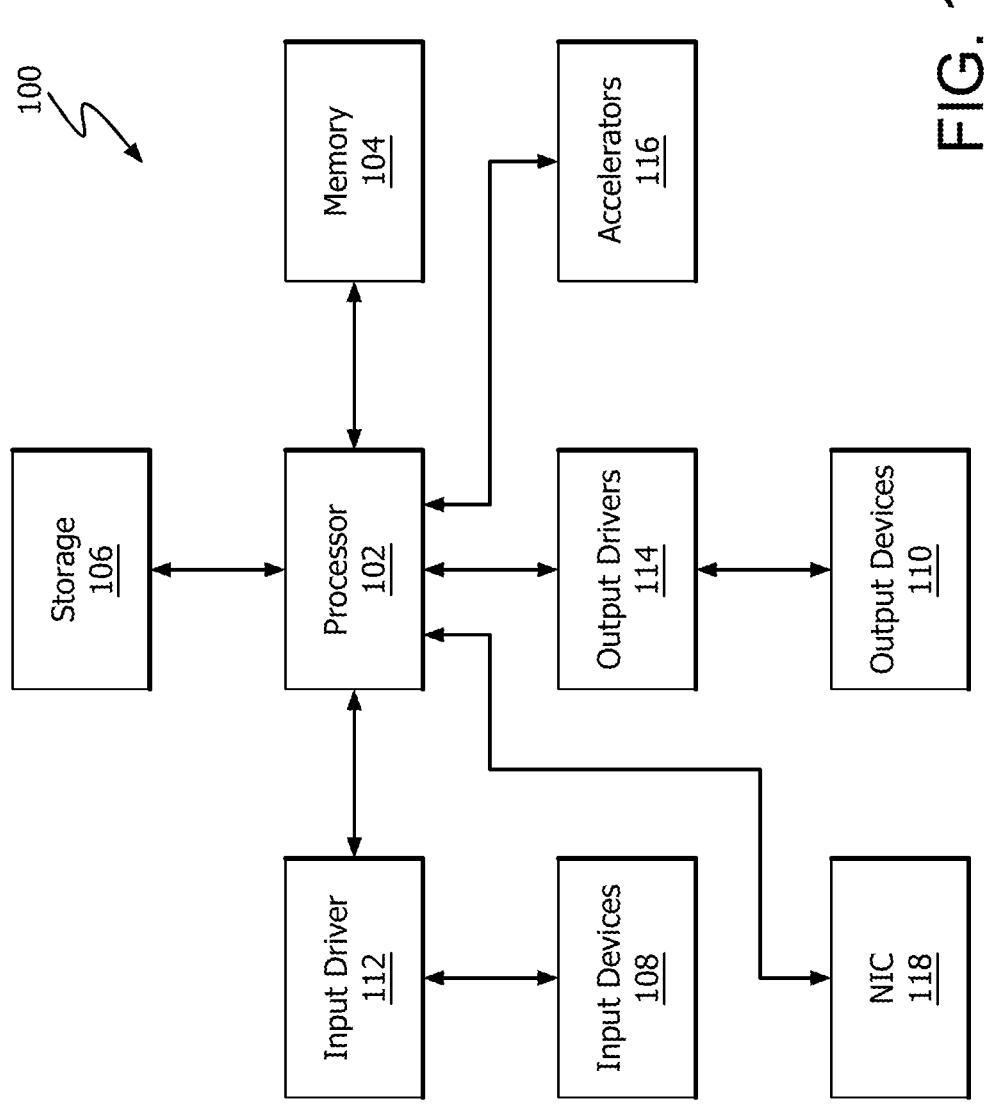
FIG. 1 is a block diagram of an example device in which one or more disclosed implementations may be implemented.

FIG. 1 is a block diagram of an example device 100 in which one or more portions of one or more disclosed implementations may be implemented. Device 100 includes, for example, a computer, a gaming device, a handheld device, a set-top box, a television, a mobile phone, or a tablet computer. Device 100 includes a processor 102, a memory 104, a storage device 106, one or more input devices 108, and one or more output devices 110. Device 100 may also optionally include an input driver 112 and an output driver 114. It is understood that device 100 may include additional components not shown in FIG. 1.

Processor 102 includes one or more of: a central processing unit (CPU), a graphics processing unit (GPU), a CPU and GPU located on the same die, or one or more processor cores, wherein each processor core is a CPU or a GPU. Memory 104 may be located on the same die as processor 102, or may be located separately from processor 102. Memory 104 includes a volatile or non-volatile memory, for example, random access memory (RAM), dynamic RAM, or a cache.

Storage device 106 includes a fixed or removable storage, for example, a hard disk drive, a solid state drive, an optical disk, or a flash drive. Input devices 108 include one or more of a keyboard, a keypad, a touch screen, a touch pad, a detector, a microphone, an accelerometer, a gyroscope, a biometric scanner or a network connection (e.g., a wireless local area network card for transmission and/or reception of wireless IEEE 802 signals). Output devices 110 include one or more of a display, a speaker, a printer, a haptic feedback device, one or more lights, an antenna or a network connection (e.g., a wireless local area network card for transmission and/or reception of wireless IEEE 802 signals).

Input driver 112 communicates with processor 102 and input devices 108, and permits processor 102 to receive input from input devices 108. Output driver 114 communicates with processor 102 and output devices 110, and permits processor 102 to send output to output devices 110. It is noted that input driver 112 and output driver 114 are optional components, and that device 100 will operate in the same manner if input driver 112 and output driver 114 are not present.

Network interface card ("NIC") 118 provides an interface to other devices via a computer network. NIC 118 is configured to communicate with an external device via a networking protocol such as Ethernet, Wi-Fi, InfiniBand, or other protocols. Accelerators 116 include one or more devices that are configured to accept and execute processing tasks. These devices include one or more of a graphics processing unit ("GPU"), field programmable gate array ("FPGA"), processing-in-memory chip ("PIM"), application-specific integrated circuit ("ASIC"), or other device.

Computing devices, such as device 100, may include several different memory units with different performance and reliability characteristics, where performance includes aspects of memory access such as access time (latency) and reliability includes the ability of memory units to avoid errors in stored data (e.g., bit flip errors caused by cosmic rays, malfunctions in storage elements caused by age, or the like). For example, a first type of memory may include a synchronous dynamic random access memory ("SDRAM") that is within a physical computer chip that is distinct from the computer chip that includes processor 102 and/or accelerators 116, and a second type of memory may include a different type of memory, such as a phase change type of memory, a high bandwidth type of memory such as hybrid memory cube type memory, or other types of memory, that is stacked with a die that includes processor 102 and/or accelerators 116. The different type of memory is closer to processor 102 and is thus accessed with less latency than the SDRAM, but the different type of memory has lower reliability than the SDRAM memory. Because of these differing performance and reliability characteristics, it is desirable to allow for selection of the memory unit in which data is placed based on a trade-off between reliability and performance. Although two types of memories are described in this example, computing device 100 may include any number of different types of memory units, with differing performance and reliability characteristics.

Figure 2:
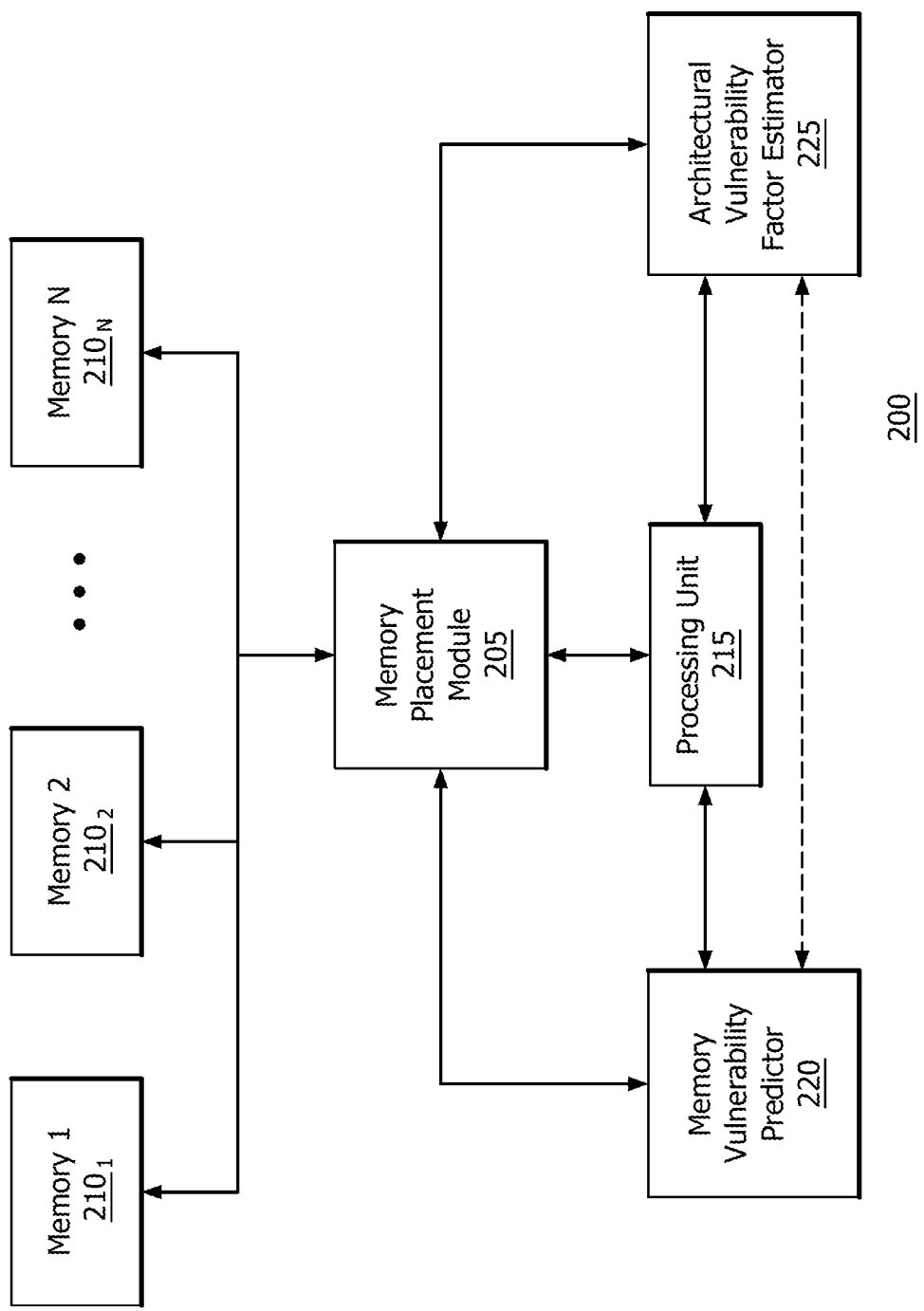
FIG. 2 is a block diagram of a system that uses memory vulnerability prediction in accordance with certain implementations.

FIG. 2 is a block diagram of a memory placement system 200 that includes a memory placement module 205 for placing memory regions in memory units $210_1$-$210_N$ in accordance with information from a memory vulnerability predictor 220, for example. In various examples, memory units $210_1$-$210_N$ include one or more of a die-stacked memory (e.g., stacked on the same die as a die in which processor 102 or accelerators 116 reside) or an off-die (e.g., not stacked with the die including processor 102 or accelerators 116), SDRAM memory (such as, for example, memory 104). Memory units $210_1$-$210_N$ alternatively or additionally include any memory available for access by processor 102 and/or accelerators 116, or any other processing units included in device 100. The term memory region is used herein as the unit of memory that can be migrated such as, for example, a page, a block and the like. The memory regions can be registers, scratchpad memory locations, physical memory locations or any address space that is program addressable. The memory region(s) have associated memory address(es) or memory address ranges.

In addition to being connected to or in communication with (collectively "connected to") to memory vulnerability predictor 220 and memory units $210_1$-$210_N$, memory placement module 205 is connected to processing unit 215 and architectural vulnerability factor (AVF) estimator 225. Processing unit 215 is further connected to memory vulnerability predictor 220 and AVF estimator 225, which in turn is further connected to memory vulnerability predictor 220.

In an implementation, memory placement system 200 is a single computer system with standard components, such as a processor (e.g., processing unit 215), one or more memories (e.g., memory units $210_1$-$210_N$), and the like, in which memory placement module 205 controls placement of memory regions among memory units $210_1$-$210_N$ available to the single computer system, including the memory units physically inside the single computer system, as well as other memory units available remotely, such as through remote direct memory access or the like. In some examples, multiple computer systems, such as computer systems for which memory units available remotely to processing unit 215 shown in FIG. 2 are local, include instances of memory placement system 200. In such examples, the multiple computer systems communicate to share failure rate data for various memory units but independently place memory regions within various memory units available to the different computer systems.

In an implementation, processing unit 215 can be a CPU, such as processor 102 in FIG. 1. In another implementation, processing unit 215 can be an accelerated processing unit, a graphics processing unit, a field-programmable gate array (FPGA), a processing-in-memory chip, an application specific integrated circuit (ASICs), or another type of processor. In an implementation, memory placement module 205, memory vulnerability predictor 220, and AVF estimator 225 are software that executes on processing unit 215 or another processing unit, are hardware, (e.g., circuits, ASICs, FPGA etc.), in communication with processing unit 215 and memory units $210_1$-$210_N$, or is a combination of software executing on processing unit 215 or on hardware in communication with memory units $210_1$-$210_N$ and processing unit 215 and other processing units.

AVF estimator 225 maintains and/or estimates indications of "vulnerability" of memory regions stored in memory units $210_1$-$210_N$ to errors. The AVF of a memory region can vary from 0% (no error in the region will affect program output) to 100% (any error in the region will affect program output). Vulnerability of memory regions to faults is defined based on the "exposure" of the memory regions to faults that actually occur. "Exposure" is dependent on the software being executed and means the likelihood or tendency of a memory fault to affect the execution state of software. The exposure is based on the time difference between when a write occurs in a memory unit and when a read occurs that reads the written value. If the time difference between a write and a read that reads the written value is long, then the memory region is exposed for a longer duration to faults. AVF can be determined using a variety of techniques including, but not limited to, "A Systematic Methodology to Compute the Architectural Vulnerability Factors for a High-Performance Microprocessor," S. Mukherjee et. al., MICRO 36 Proceedings of the 36th Annual IEEE/ACM International Symposium on Microarchitecture, page 29, 2003; "Online Estimation of Architectural Vulnerability Factor for Soft Errors," Xiaodong Li, et al., Proceedings of the International Symposium on Computer Architecture, June 2008; and U.S. application Ser. No. 15/389,573, titled "Waterfall Counters And An Application To Architectural Vulnerability Factor Estimation", filed on Dec. 23, 2016, each of which is incorporated by reference herein in their entirety.

The AVF of a memory region is, in part, driven by what code is doing with respect to the memory region. If the same code is applied to different memory regions, the AVFs for those memory regions should be similar. Memory vulnerability predictor 220 maintains an AVF predictor table that uses prior AVF information to predict the AVF of a future memory region using the above underpinnings. An illustrative AVF predictor table is shown in Table 1, where each entry in the table associates a code index with a set of memory address and AVF pairs:

TABLE 1

| Code Index | | | |
| --- | --- | --- | --- |
| 1 | {Memory Address, AVF} | {Memory Address, AVF} | . . . |
| 2 | {Memory Address, AVF} | {Memory Address, AVF} | . . . |

In general, when a memory access instruction is encountered, a code index associated with the memory access instruction is looked up in the AVF predictor table. The code index identifies all, at least one, a most recently used, x most recently used, or combination thereof of memory addresses that have been impacted or touched by the memory access instruction (i.e., the code). If an entry corresponding to that code index does not exist, a new entry is created for that code index. An AVF for the memory address associated with the code index for the new entry may be obtained from AVF estimator 225, for example, using the techniques described herein. If an entry corresponding to the code index exists, a memory address associated with the code index is looked up in the entry. If the memory address exists in the entry, an associated AVF is used as an estimate for the AVF of that memory region. As described below, the associated AVF can be a predicted AVF or a known AVF. If the memory address does not exist, the table generates a prediction for the AVF based on the other memory addresses at the entry, if any, and this is used as the estimated AVF for the memory address. The memory address is then added to the entry with that AVF prediction.

The AVF values in the AVF predictor table can be a predicted AVF or a known AVF. A flag can be used to denote whether the value is a predicted AVF or a known AVF. A predicted AVF is generated from other memory address(es) at a particular table entry. Predicted AVF values can be generated by taking the average of all predicted or known AVFs in the entry, the latest known AVF, or by using other methods to combine the AVFs in each entry. In an implementation, the setting of the flag can be used to weigh AVFs differently when generating a predicted AVF. AVF estimator 210 can update the AVF of a memory address with a known AVF once it has been determined in accordance with the techniques mentioned herein above. The flag is then updated from predicted AVF to known AVF.

As noted, the AVF predictor table can be indexed by a code index that refers to a code region (where code region is used to refer any basic code block), program counter, or any like parameter that tracks or marks code usage. Each entry in the AVF predictor table associates a code index with a set of memory addresses (associated with the memory region) and AVF pairs. In an implementation, the values of the code index and memory addresses can each be ranges instead of individual values or addresses. Individual memory accesses within these ranges would alias to the same entry.

In an implementation, the AVF predictor table can be structured as a cache. In an implementation, instruction cache replacement rules can be used since the instruction cache will track code usage to maintain relevant portions of the AVF predictor table in the cache. In an implementation, table entries in the AVF predictor table can be pushed to a backing memory storage.

Operationally, memory placement module 205 can proactively place memory regions among various memory units $210_1$-$210_N$ based on input from at least memory vulnerability predictor 220 and/or AVF estimator 225. Placement of memory regions can be further related to usage of the memory regions by processing unit 215 and other processing units.

Figure 3:
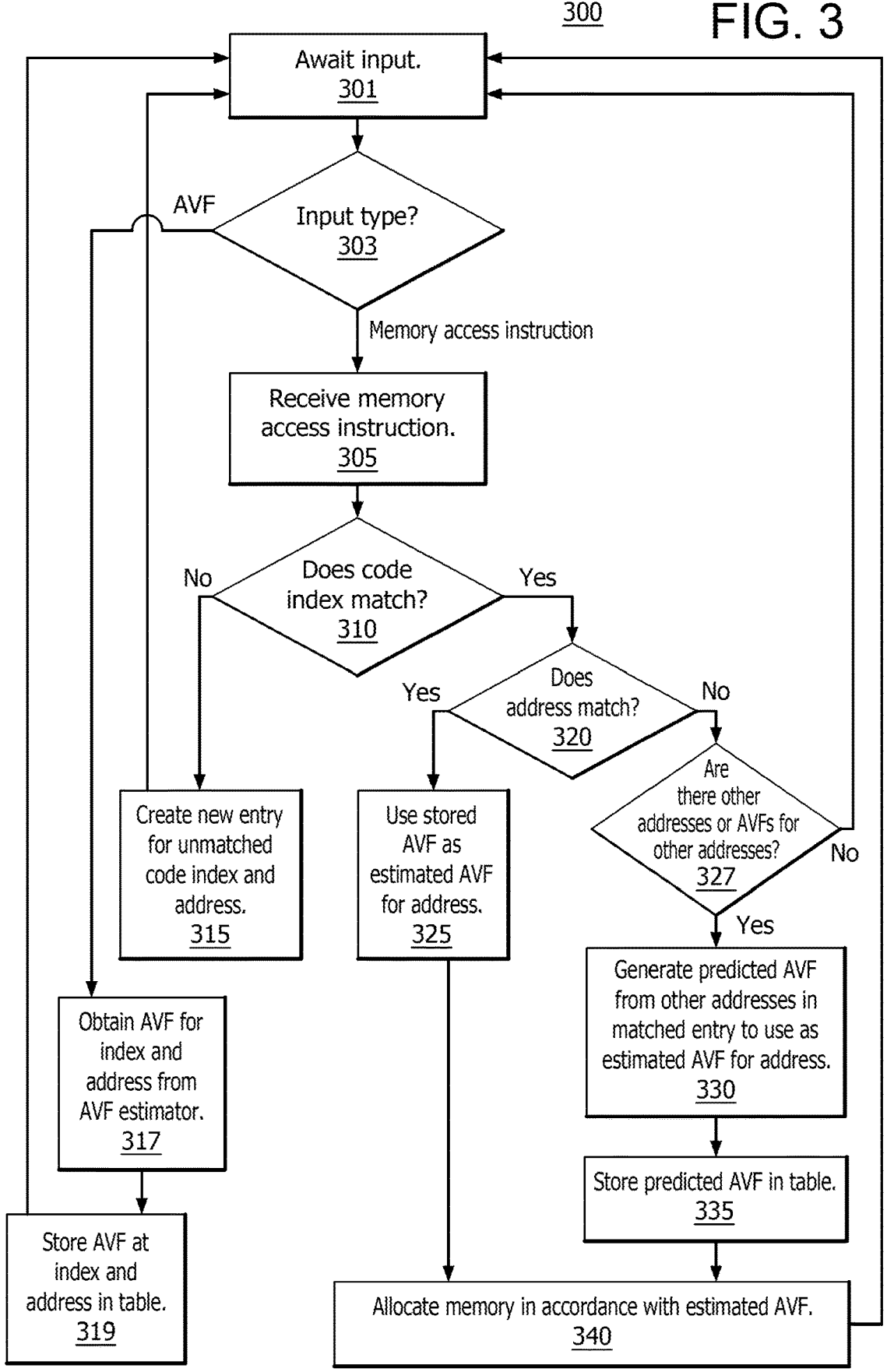
FIG. 3 is an example flow diagram of a method for memory vulnerability prediction in accordance with certain implementations.

FIG. 3 is an example flow diagram of a method 300 for memory vulnerability prediction in accordance with certain implementations. Initially, method 300 is in a wait state for receiving an input type (step 301). Upon reception of an input during the running of an application or program, the type of input is determined (step 303). A memory access instruction is received and processed if the input type is a memory access instruction (step 305). A code index (from the memory access instruction) associated with a given code (or code segment) is matched against an AVF predictor table (step 310). If the code index does not exist in the AVF predictor table, a new entry in created in the AVF predictor table for the unmatched code index and address (step 315). Method 300 then returns to await input 301 for the next input.

If the code index does match an entry in the AVF predictor table (step 310), an address (or address range) associated with the memory access instruction is compared against the other addresses (or address ranges) in the matched entry (step 320). If the address matches one of the other addresses (or address ranges), then an AVF associated with the matched address is used as an estimated AVF for the address (step 325). In certain implementations, the estimated AVF can be a predicted AVF or a known AVF. In an implementation, a flag is set to indicate that the stored AVF is a predicted AVF. In an implementation, the predicted AVF is updated with a known AVF. In an implementation, memory in a memory system is allocated in accordance with the estimated AVF (step 340). In another implementation, data is moved between memories of different types. In another implementation, voltage to a memory can be temporarily increased. In another implementation, if an aggregate AVF exceeds a threshold, a stronger memory protection scheme is enabled. The aggregate AVF, for example, can be the total AVF of all ranges tracked in a particular table or similar structure. In another implementation, a system-level monitoring agent is notified, which can take compensatory actions or track cumulative reliability at a system or data center level. Method 300 then returns to await input 301 for the next input.

If the address does not match one of the other addresses (or address ranges; step 320), a determination is made whether there are other addresses or AVFs from other addresses (step 327). If there are no other addresses or AVFs from other addresses (step 327), then method 300 then returns to await input 301 for the next input. If there are other addresses or AVFs from other addresses, then a predicted AVF is generated from AVFs associated with the other addresses (or address ranges) in the matched entry (step 330). The predicted AVF is used as an estimated AVF for the address. In certain implementations, the predicted AVF is generated by using any of a number of techniques for combining the AVFs associated with the other addresses (or address ranges). The predicted AVF is entered into the AVF predictor table for the address (step 335). In an implementation, the predicted AVF is updated with a known AVF. In an implementation, a flag is set to indicate that the stored AVF is a predicted AVF. In an implementation, memory is allocated in accordance with the estimated AVF (step 340). In another implementation, data is moved between memories of different types. In another implementation, voltage to a memory can be temporarily increased. In another implementation, if an aggregate AVF exceeds a threshold, a stronger memory protection scheme is enabled. The aggregate AVF, for example, can be the total AVF of all ranges tracked in a particular table or similar structure. In another implementation, a system-level monitoring agent is notified, which can take compensatory actions or track cumulative reliability at a system or data center level. Method 300 then returns to await input 301 for the next input.

An AVF estimate or value may be obtained from an AVF estimator (step 317) if the input type is an AVF estimate (step 303). The AVF estimate is stored at the appropriate index and address in the table (step 319). Method 300 then returns to await input 301 for the next input.

In general and without limiting embodiments described herein, a computer readable non-transitory medium including instructions which when executed in a processing system cause the processing system to execute a method for memory vulnerability prediction.

In general, a method for memory vulnerability prediction is described herein. It is determined if a code index associated with a memory access instruction matches entries in an architectural vulnerability factor (AVF) predictor table and if a memory address associated with the memory access instruction matches addresses at a matched entry in the AVF predictor table. A predicted AVF is generated from AVFs associated with the addresses at the matched entry as an estimated AVF for unmatched memory address. A memory is allocated based on the estimated AVF. In an implementation, a stored AVF is used as the estimated AVF for a matched memory address. In an implementation, the predicted AVF is stored in the AVF predictor table and a flag is set to indicate that a stored AVF is a predicted value. In an implementation, the predicted AVF is updated with a known AVF and a flag is set to indicate that the stored AVF is a known value. In an implementation, a new entry is created in the AVF predictor table for an unmatched code index. In an implementation, an AVF is obtained from an AVF estimator for an address associated with the unmatched code index. In an implementation, the stored AVFs are combined in the entry to determine the predicted AVF.

In general, an apparatus for memory vulnerability prediction includes a memory architecture, an architectural vulnerability factor (AVF) predictor table, and a processor in communication with the memory architecture and the AVF predictor table. The processor determines if a code index associated with a memory access instruction matches entries in the AVF predictor table and determines if a memory address associated with the memory access instruction matches addresses at a matched entry in the AVF predictor table. The processor then generates a predicted AVF from AVFs associated with the addresses at the matched entry as an estimated AVF for unmatched memory address and performs an action based on the estimated AVF. In an implementation, the processor uses a stored AVF as the estimated AVF for a matched memory address. In an implementation, the processor stores the predicted AVF in the AVF predictor table and sets a flag to indicate that a stored AVF is a predicted value. In an implementation, the processor updates the predicted AVF with a known AVF and sets the flag to indicate that the stored AVF is a known value. In an implementation, the processor creates a new entry in the AVF predictor table for an unmatched code index. In an implementation, the processor obtains an AVF from an AVF estimator for an address associated with the unmatched code index. In an implementation, the action is at least one of allocating memory in accordance with the estimated AVF, moving data between memories of different types, temporarily increasing voltage to a memory, enabling a stronger memory protection scheme if an aggregate AVF exceeds a threshold, and notifying a system-level monitoring agent to take compensatory actions or track cumulative reliability at a system or data center level. In an implementation, the processor combines stored AVFs in the entry to determine the predicted AVF.

In general, an apparatus for memory vulnerability prediction includes a memory architecture, an architectural vulnerability factor (AVF) predictor table, a memory placement circuit in communication with the memory architecture, and a memory vulnerability predictor circuit in communication with the AVF predictor table and the memory placement circuit. The memory vulnerability predictor circuit determines if a code index associated with a memory access instruction matches entries in the AVF predictor table and determines if a memory address associated with the memory access instruction matches addresses at a matched entry in the AVF predictor table. The memory vulnerability predictor circuit then generates a predicted AVF from AVFs associated with the addresses at the matched entry as an estimated AVF for unmatched memory address. The memory placement circuit allocates a memory in the memory architecture based on the estimated AVF. In an implementation, the memory vulnerability predictor circuit uses a stored AVF as the estimated AVF for a matched memory address. In an implementation, the memory vulnerability predictor circuit stores the predicted AVF in the AVF predictor table and sets a flag to indicate that a stored AVF is a predicted value. In an implementation, the memory vulnerability predictor circuit updates the predicted AVF with a known AVF and sets the flag to indicate that the stored AVF is a known value. In an implementation, the memory vulnerability predictor circuit creates a new entry in the AVF predictor table for an unmatched code index. In an implementation, the apparatus further includes an AVF estimator circuit. In an implementation, the memory vulnerability predictor circuit obtains an AVF from the AVF estimator circuit for an address associated with the unmatched code index.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the implementations.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for memory vulnerability prediction, the method comprising:
   determining if a code index associated with a memory access instruction matches an entry in an architectural vulnerability factor (AVF) predictor table;
   if the code index matches the entry:
      determining if a memory address associated with the memory access instruction matches an address of at least one addresses at the entry in the AVF predictor table;
   if the memory address associated with the memory access instruction does not match an address of the at least one addresses at the entry:
      generating a predicted AVF from at least one AVFs associated with the at least one addresses at the matched entry,
      adding the predicted AVF to the AVF predictor table as an estimated AVF for unmatched memory addresses associated with the memory access instruction, and
      allocating a memory in a memory system based on the estimated AVF;
   wherein the predicted AVF indicates a vulnerability to soft hardware errors.

2. The method of claim 1, further comprising:
   using a stored AVF as the estimated AVF for a matched memory address.

3. The method of claim 1, further comprising:
   storing the predicted AVF in the AVF predictor table; and
   setting a flag to indicate that a stored AVF is a predicted value.

4. The method of claim 3, further comprising:
   updating the predicted AVF with a known AVF; and
   setting the flag to indicate that the stored AVF is a known value.

5. The method of claim 1, further comprising:
creating a new entry in the AVF predictor table for an unmatched code index.

6. The method of claim 5, further comprising:
obtaining an AVF from an AVF estimator for an address associated with the unmatched code index.

7. The method of claim 1, wherein the generating further comprises:
combining stored AVFs in the entry to determine the predicted AVF.

8. An apparatus for memory vulnerability prediction, comprising:
a memory architecture;
an architectural vulnerability factor (AVF) predictor table; and
a processor in communication with the memory architecture and the AVF predictor table;
wherein the processor determines if a code index associated with a memory access instruction matches an entry in the AVF predictor table;
wherein if the code index matches the entry, the processor determines if a memory address associated with the memory access instruction matches an address of at least one addresses at the entry in the AVF predictor table; and
wherein if the memory address associated with the memory access instruction does not match an address of the at least one addresses at the entry:
the processor generates a predicted AVF from at least one AVFs associated with the at least one addresses at the matched entry, adds the predicted AVF to the ADF predictor table as an estimated AVF for unmatched memory addresses associated with the memory access instruction, and performs an action based on the estimated AVF;
wherein the predicted AVF indicates a vulnerability to soft hardware errors.

9. The apparatus of claim 8, wherein the processor uses a stored AVF as the estimated AVF for a matched memory address.

10. The apparatus of claim 8, wherein the processor:
stores the predicted AVF in the AVF predictor table; and
sets a flag to indicate that a stored AVF is a predicted value.

11. The apparatus of claim 10, wherein the processor:
updates the predicted AVF with a known AVF; and
sets the flag to indicate that the stored AVF is a known value.

12. The apparatus of claim 8, wherein the processor:
creates a new entry in the AVF predictor table for an unmatched code index; and,
obtains an AVF from an AVF estimator for an address associated with the unmatched code index.

13. The apparatus of claim 8, wherein the action is at least one of allocating memory, moving data between memories of different types, temporarily increasing voltage to a memory, enabling a stronger memory protection scheme if an aggregate AVF exceeds a threshold, and notifying a system-level monitoring agent to take compensatory actions or track cumulative reliability at a system or data center level.

14. The apparatus of claim 8, wherein the processor combines stored AVFs in the entry to determine the predicted AVF.

15. An apparatus for memory vulnerability prediction, comprising:
a memory architecture;
an architectural vulnerability factor (AVF) predictor table;
a memory placement circuit in communication with the memory architecture; and
a memory vulnerability predictor circuit in communication with the AVF predictor table and the memory placement circuit,
wherein the memory vulnerability predictor circuit determines if a code index associated with a memory access instruction matches an entry in the AVF predictor table;
wherein if the code index matches the entry, the memory vulnerability predictor circuit determines if a memory address associated with the memory access instruction matches an address of at least one addresses at the entry in the AVF predictor table; and
wherein if the memory address associated with the memory access instruction does not match an address of the at least one addresses at the entry:
the memory vulnerability predictor circuit generates a predicted AVF from at least one AVFs associated with the at least one addresses at the matched entry, and adds the predicted AVF to the ADF predictor table as an estimated AVF for unmatched memory addresses associated with the memory access instruction;
wherein the memory placement circuit allocates a memory in the memory architecture based on the estimated AVF; and
wherein the predicted AVF indicates a vulnerability to soft hardware errors.

16. The apparatus of claim 15, wherein the memory vulnerability predictor circuit uses a stored AVF as the estimated AVF for a matched memory address.

17. The apparatus of claim 15, wherein the memory vulnerability predictor circuit:
stores the predicted AVF in the AVF predictor table; and
sets a flag to indicate that a stored AVF is a predicted value.

18. The apparatus of claim 17, wherein the memory vulnerability predictor circuit:
updates the predicted AVF with a known AVF; and
sets the flag to indicate that the stored AVF is a known value.

19. The apparatus of claim 15, wherein the memory vulnerability predictor circuit:
creates a new entry in the AVF predictor table for an unmatched code index.

20. The apparatus of claim 19, further comprising an AVF estimator circuit, wherein the memory vulnerability predictor circuit obtains an AVF from the AVF estimator circuit for an address associated with the unmatched code index.

* * * * *